INVENTORS.
SAM JAFFE
GREGORY L. THOMPSON

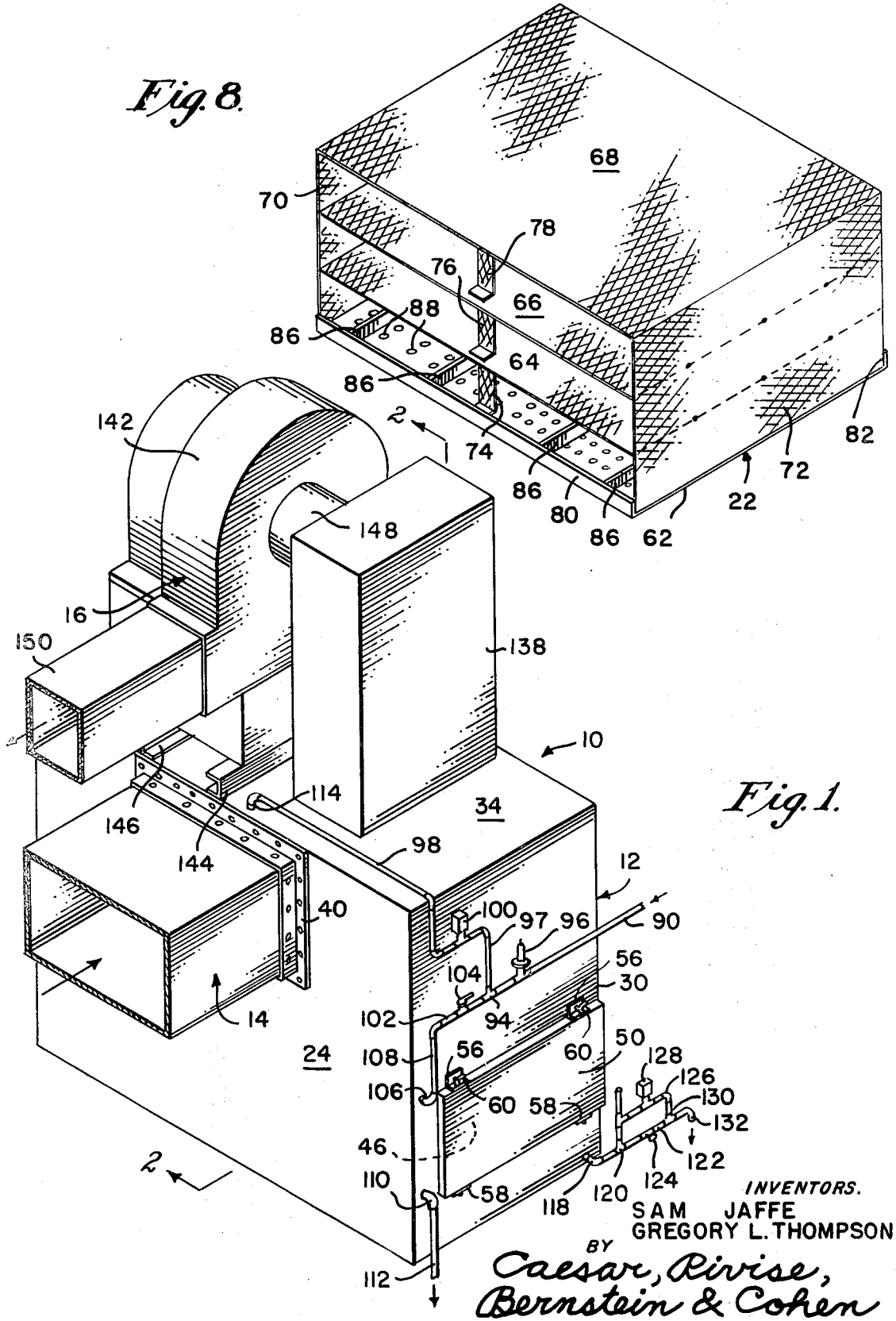

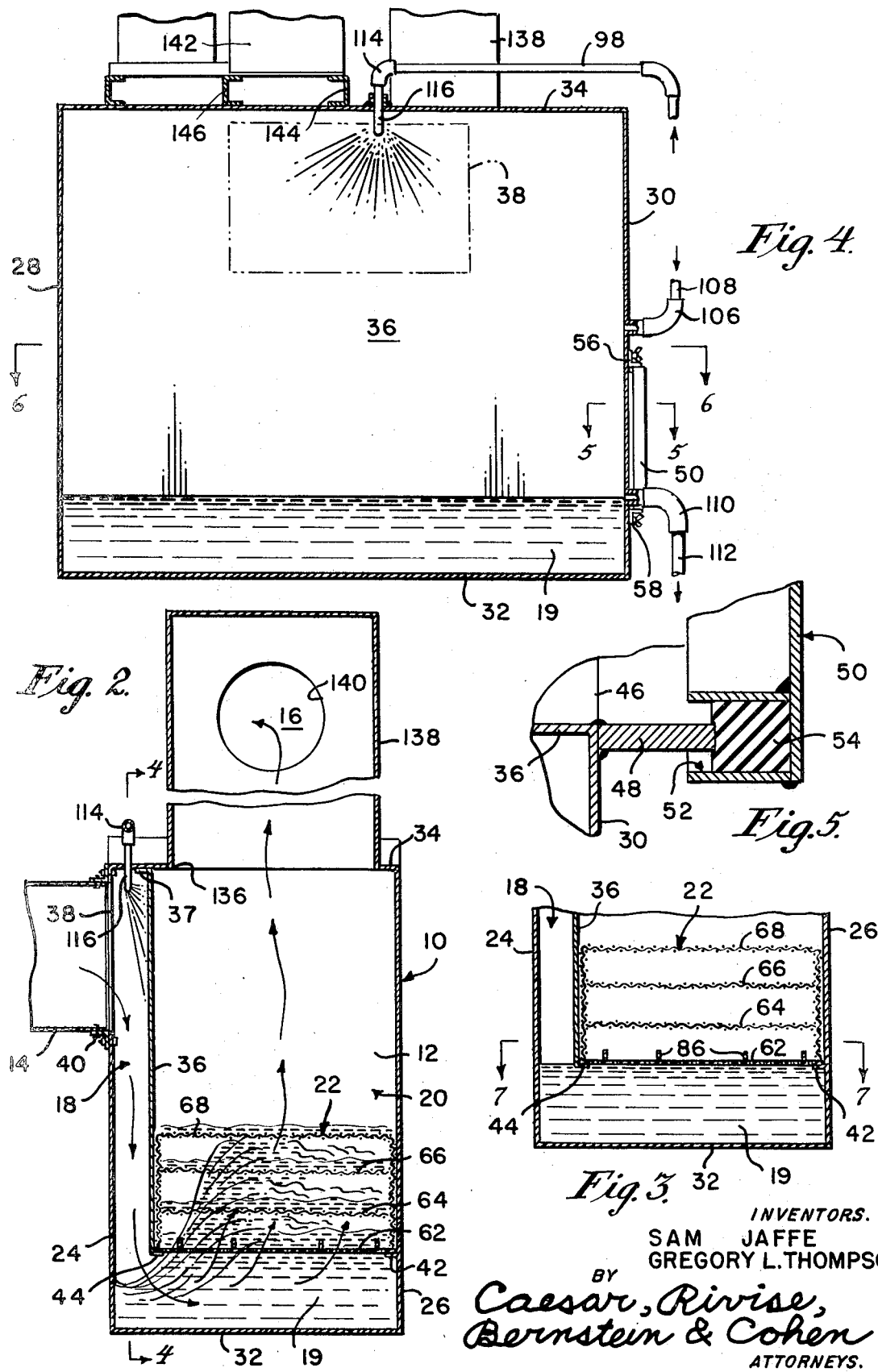

United States Patent Office 3,516,647
Patented June 23, 1970

3,516,647
ANTI-AIR POLLUTION DEVICE
Sam Jaffe, Wyncote, and Gregory L. Thompson, Maple Glen, Pa., assignors to Johnson-March Corporation, Philadelphia, Pa., a corporation of Pennsylvania
Filed July 11, 1967, Ser. No. 652,494
Int. Cl. B01d 47/02
U.S. Cl. 261—24                                          8 Claims

ABSTRACT OF THE DISCLOSURE

An anti-air pollution device for removing impurities from polluted air. The device comprises a housing having an inlet chamber, a main chamber and an exhaust means for drawing the polluted air through the inlet and the main chambers. The inlet chamber and the main chamber have a common portion which acts as a receptacle for water. The main chamber further includes a first perforated member for distributing the air drawn from the inlet chamber uniformly through the inlet chamber. The water and the first member act to shred the polluted air as it is drawn through the water and the first member so that contact between the water and the shredded air removes the impurities from the polluted air.

---

This invention relates generally to anti-air pollution devices and more particularly to an anti-air pollution device for removing impurities from polluted air prior to exhausting the air into the atmosphere.

Existing systems for removing impurities from air prior to the insertion of the air into the atmosphere typically do so by means of filtration. That is, either liquid or screen mesh type filters are used for the filtration of the exhausted air. The exhaust is thus passed therethrough prior to insertion into the atmosphere.

The disadvantages of such a system are that the filters are very expensive and must be replaced often. For screen mesh type filters, the large amount of impurities in exhausted air cause the filters to be saturated with impurities in a very short time thereby requiring repeated replacement. Similarly, with the use of a liquid type of filter, the liquid must be continuously run through the system in order to provide clear liquid for the filtering process. The liquid otherwise becomes saturated with impurities and the filtration process breaks down.

It is therefore an object of the invention to overcome the aforementioned disadvantages.

Another object of the invention is to provide a new and improved anti-air pollution device which uses ordinary water as a scrubbing device for cleaning polluted air, said water being usable for relatively long periods of time.

Another object of the invention is to provide a new and improved anti-air pollution device which scrubs the air by shredding the air into its finest components and mixing the shredded air with water for removal of the impurities in said air.

Another object of the invention is to provide a new and improved anti-air pollution device which includes means for uniformly distributing polluted air through a main processing chamber to facilitate scrubbing said air.

Another object of the invention is to provide a new and improved anti-air pollution device which includes a baffle plate and a plurality of screens at which the air is scrubbed to clean the air.

These and other objects of the invention are achieved by providing an anti-air pollution device for removing impurities from polluted air, said device comprising a housing having an inlet chamber, a main chamber, and an exhaust means for drawing said polluted air through said inlet and said main chambers, said inlet chamber and said main chamber having a common portion which acts as a receptacle for water, said main chamber further including a first perforated member for distributing said air drawn from said inlet chamber uniformly through said main chamber, said water and said first member so that contact between said water and said shredded air removes said impurities from said polluted air.

Other objects and many of the attendant advantages of this invention will be readily appreciated as the same becomes better understood by reference to the following detailed description when considered in connection with the accompanying drawings wherein:

FIG. 1 is a perspective view of an anti-air pollution device embodying the invention per se;

FIG. 2 is a sectional view taken along the line 2—2 in FIG. 1;

FIG. 3 is a fragmentary sectional view also taken along the line 2—2 with the anti-air pollution device embodying the invention being in a quiescent state;

FIG. 4 is a sectional view taken along the line 4—4 in FIG. 2;

FIG. 5 is an enlarged fragmentary view taken along the line 5—5 in FIG. 4;

FIG. 8 is a perspective view of one of the inserts per se that is used in the anti-air pollution device embodying the invention.

Referring now in greater detail to the various figures of the drawing wherein similar reference characters refer to similar parts, an anti-air pollution device embodying the invention is shown generally at 10 in FIG. 1.

Figure 6:
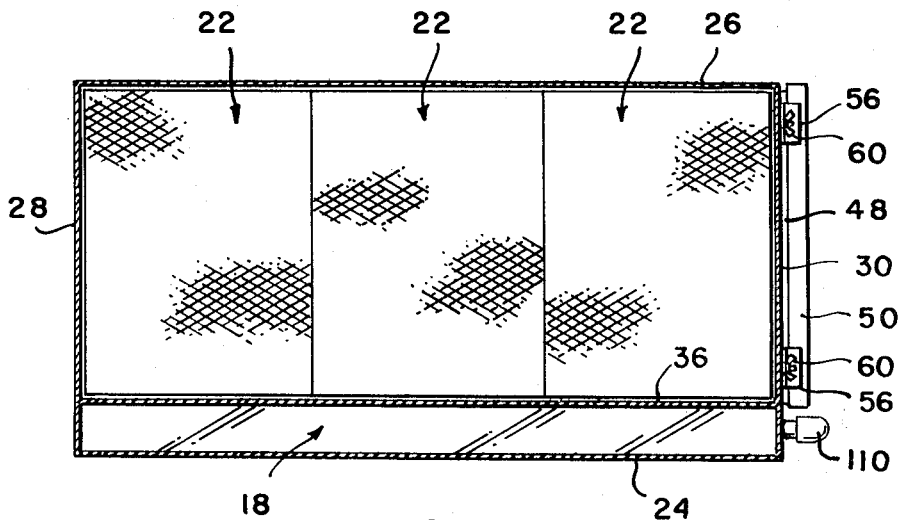
FIG. 6 is a sectional view taken along the line 6—6 in FIG. 4.

The anti-air pollution device basically comprises a main processing portion 12, a polluted air intake pipe 14 and a scrubbed air outlet section 16. Therefore, as best seen in FIG. 2, the air is drawn through the intake pipe 14 down through an inlet chamber 18 of the main processing portion 12 through a body of water 19 which is stored at the bottom of the main processing portion 12 into a main chamber 20 of the main processing portion 12 via screen inserts 22 and up into the scrubbed air outlet section 16.

The main processing portion 12 which is best seen in FIGS. 1, 2, 4 and 6 is generally rectangular and includes a pair of vertically extending rectangular planar side walls 24 and 26, a pair of vertically extending rectangular planar end walls 28 and 30, a horizontally extending rectangular planar bottom wall 32 and top wall 34 which are vertically spaced by said side and end walls. The main processing portion further includes a rectangular planar inner wall 36 which depends vertically from top wall 34 and is suitably secured thereto at a horizontally extending flange 37 which extends along the uppermost edge of the inner wall and which is integral therewith. Wall 36 is adjacent to yet spaced from side wall 24 and extends parallel thereto. These walls form between them the inlet chamber 18.

Side wall 24 includes adjacent its uppermost edge a rectangular opening 38 through which polluted air is passed to inlet chamber 18 from intake pipe 14. The intake pipe 14 is of hollow rectangular cross-section and is secured adjacent opening 38 by a mounting bracket 40 to the wall 24 so that the hollow bore of intake pipe 14 is aligned with opening 38. Mounting bracket 40 is elongated and extends rectangularly and peripherally about the intake pipe 14 and is of L-shaped cross-section as best seen in FIG. 2. Suitable fasteners are provided for securing the bracket 40 to the pipe 14 and wall 24. Wall 26 of the main processing portion 12 which extends vertically, includes an inwardly extending horizontal flange 42 which extends horizontally along the length thereof adjacent and along the lowermost portion of the main processing portion 12. A similar inwardly extending flange 44 is provided integrally of the depending inner wall 36. The flange 44 extends inwardly of the main chamber 20 of the main processing portion 12 of the anti-air pollution device and is aligned with flange 42.

Figure 7:
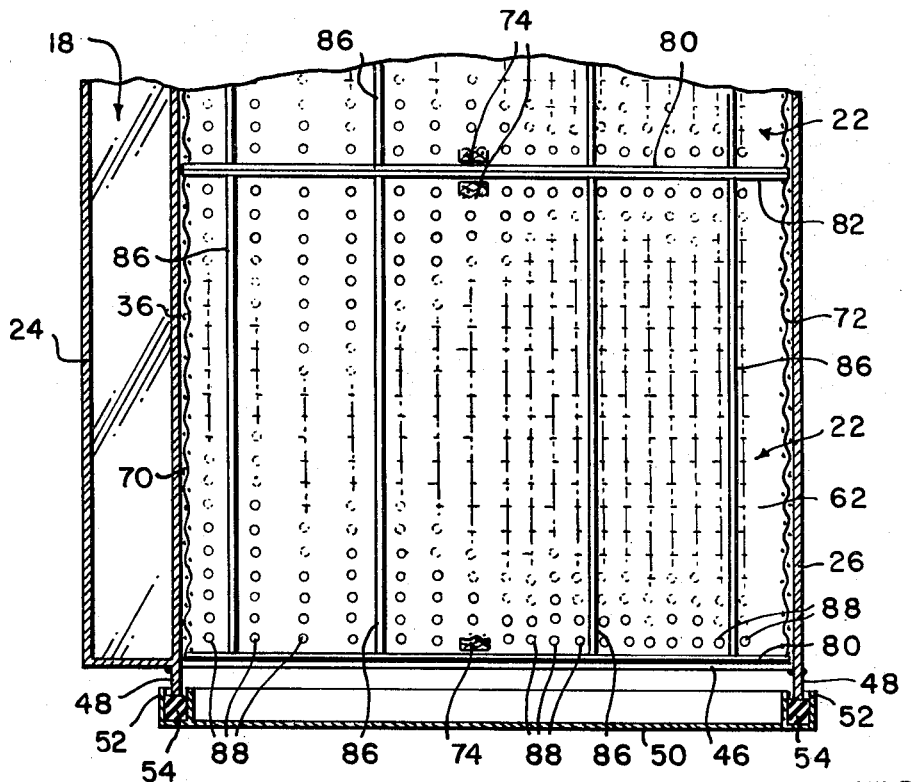
FIG. 7 is an enlarged sectional view taken along the line 7—7 in FIG. 3.

As best seen in FIG. 3, the level of water 19 rises to substantially the height of flanges 42 and 44 when the anti-air pollution device 10 is in a quiescent state and not in operation. As best seen in FIGS. 4 and 5, end wall 30 includes a rectangular opening 46, the lower end of which is aligned with the height of flanges 42 and 44. The opening 46 is best seen in FIGS. 5 and 7 and is slightly larger than the cross-section of the screen inserts 22. The opening 46 is bounded by a rectangular collar 48 which projects outwardly of the opening and is preferably welded to wall 30 about the periphery of opening 46.

A rectangular releasable cover 50 is provided for closing opening 46 when device 10 is in operation. The cover 50 includes a U-shaped channel 52 which faces inwardly of the anti-air pollution device 10 and extends about the periphery of the cover 50. The U-shaped channel 52 includes a spongy insert 54 therein which is provided completely along channel 52 so that when the cover 40 is placed over opening 46, the channel 52 envelopes the end of collar 48 and the insert 54 thereby provides a water and air tight seal about the cover 50.

As best seen in FIGS. 1 and 4, cover 50 also includes a pair of brackets 56 along its uppermost surface and a pair of brackets 58 along its lowermost surface. Threaded fasteners are suitably secured to the outer surface of wall 30 and are adapted to extend through brackets 56 and 58 and be secured by butterfly nuts 60 for releasably securing the cover to wall 30 of the main processing portion 12. Cover 50 is removed to place inserts 22 into the main processing portion 12. As best seen in FIGS. 2 and 3, inserts 22 rest upon the flanges 42 and 44. As best seen in FIGS. 6 and 7, three inserts 22 are required along the length of the main processing portion 12.

As best seen in FIG. 8, an insert basically comprises a lowermost baffle plate 62 which is horizontal and which supports three horizontal screens 64, 66 and 68. The insert also comprises a pair of screen side walls 70 and 72. The side walls 70 and 72 are preferably integral with the top screen 68 and are secured preferably by welding to opposite ends of the screens 64 and 66. Screens 64, 66 and 68 and side walls 70 and 72 basically comprise expanded metal. Spacers 74 which extend vertically between the baffle plate 62 and screen 64 are provided to maintain a uniform space between screen 64 and the baffle 62. Similarly, vertically extending spacers 76 are provided between screens 64 and 66 to maintain the spacing therebetween and spacers 78 are provided between screens 66 and 68 to maintain the vertical spacing therebetween. The baffle plate 62 includes a forwardmost integral vertical upstanding flange 80 which extends transversely along the forwardmost edge of the baffle plate 62 and a rearmost integral vertically extending flange 82 which extends transversely along the rearmost edge of the baffle.

Longitudinally extending ribs 86 which are parallel to the side walls 70 and 72 are provided which extend from the forward flange 80 to the rear flange 82. These ribs, in conjunction with flanges 80 and 82, act to stiffen the baffle plate 62.

Referring to FIG. 7, it can be seen that circular openings 88 are provided throughout the baffle plate 62. It should be noted that the closer the openings 88 are to inner wall 36, the further spaced are the openings 88 from each other. As the distance from the inner wall 38 increases, the openings 88 become more closely spaced to each other. Thus, the density of the openings 88 becomes greater and greater. That is, the openings 88 adjacent inner wall 36 are widely spaced compared to the openings 88 provided adjacent the side wall 26. As will hereinafter be seen, the uneven distribution of openings in the baffle 62 enables a more uniform distribution of the air through the main chamber 20 of the main processing portion 12.

The main processing portion 12 includes pipes about its outer surface for supplying water to various portions of the anti-air pollution device 10. A main pipeline 90 receives water from a conventional water outlet or faucet (not shown). Pipe 90 is connected to a T-section 94 via a pressure reducer 96. Also connected to the T-section 94 is a vertically extending pipe 97 which is connected to a horizontally extending pipe 98 via a solenoid valve 100. Also connected to the T-section 94 is a horizontally extending pipe 102 which is connected thereto by a manually controlled valve 104. Pipe 102 is secured to an L-shaped section 106 via a vertically extending pipe 108. L-shaped section 106 extends into wall 30 and into the inlet chamber 18 and, as will hereinafter be seen, provides water 19 to the anti-air pollution device 10.

Another L-shaped section of pipe 110 is provided which extends out of wall 30 aligned below socket 106 and provided at substantially the same height as the flanges 42 and 44 provided within chamber 20 of the main processing portion 12. The section 110 is connected to a vertical pipe 112 which is an outlet pipe for the removal of excess water in the system. As will hereinafter be seen, this pipe enables filling the main processing portion with water to the height of the flanges 42 and 44.

The horizontally extending pipe 98 provided along top wall 34 of the main processing portion 12 extends to an L-shaped section 114 which, as best seen in FIG. 2, extends through the top wall 34 and is connected to a vertically extending sprayer 116 which provides a spray of water in inlet chamber 18 as the polluted air is drawn into the inlet chamber. This spray acts to replace the water lost by evaporation in the main chamber 20 and to cool the air drawn into the inlet chamber.

An outlet pipe 118 is secured in wall 30 of the main procesing portion 12 and extends into the chamber 20 adjacent the lowermost surface thereof and provides an outlet pipe for removal of the water in the bottom of chambers 18 and 20 of the anti-air pollution device 10. Pipe 118 is connected via a T-section 120 to a first pipe 122 which includes a manually adjustable valve 124 and to a second pipe 126 which includes a solenoid valve 128. Pipes 126 and 122 are connected to an exhaust pipe 132. Valve 124 is normally closed, but is opened to remove all of the water in chambers 18 and 20. Valve 128 is normally closed, but is opened automatically when device 10 is in operation. If the water pressure in chambers 18 and 20 becomes too great when the system is in operation, the excess water is allowed to drain through pipes 126 and 132 to lower the pressure.

The top wall 34 of the main processing portion 12 includes a rectangular opening 136. A rectangular hollow hood 138 is provided adjacent the opening 136 and is secured to wall 34 preferably by welding about the periphery of the opening 136. The hood 138 includes a circular opening 140 in one of its vertical side walls. The air outlet section 16 comprise a fan housing 142. The housing 142 is mounted to the top of wall 34 at a pair of U-shaped channels 144 and 146 which extend horizontally along the top surface of wall 34. The fan housing 142 is connected to opening 140 in hood 138 by a hollow tube 148 which enables communication between the chamber 20 of the main processing portion 12 and the housing of fan 142. The air outlet section also includes a hollow pipe of rectangular cross-section which is connected to the fan housing 142. Thus, the fan provided in housing 142 draws the air in the chamber 20 through tube 148 and emits the air out of the outlet pipe 150 which is channeled to the atmosphere.

Prior to operation of the device 10, water is placed in the main processing portion 12 in the common receptacle formed at the bottom of chambers 18 and 20 of the anti-air pollution device by opening valve 104 and allowing the water from pipe 90 to enter the main processing portion via inlet chamber 18. As soon as the water has obtained the height of the flanges 42 and 44 and is adjacent the surface of baffle plates 62 of the inserts 22, any further water placed into the system is drained off by pipe sections 110 and 112.

The valve 104 is then closed and the system is ready for operation. The fan in housing 142 is started and draws air through the intake pipe 14 down through inlet chamber 18, through water 19, up through the inserts 22, and out the outlet pipe 150.

The anti-air pollution device is preferably used to remove impurities from the air which is exhausted from furnaces. Thus, in use pipe 14 carries the exhausted air from a furnace, in the direction of the arrows shown in FIGS. 1 and 2 into the inlet chamber 18. When the system is in operation, the solenoid valve 100 is operated to allow water to be piped to the spray pipe 116 which provides a fine spray of water to the air being drawn through the intake pipe 14. The water acts to replace the water which evaporates in the process of scrubbing the air as well as to cool the warm air exhaust from the furnace. The air being drawn through chamber 18 tends to urge the water 19 which is at the bottom thereof out of the inlet chamber towards the main chamber 20 of the main processing portion 12.

The baffle plates 62 of each of the inserts 22 act to uniformly distribute the air into the main chamber 20 in that there is a greater density of openings farther away from the inlet chamber 18 which thereby offers less resistance to the air as the distance increases from inner wall 36. The greater density of openings in the baffle plates 62 adjacent wall 26 overcomes the tendency of the air to take the shortest path from chamber 18 through the portions of baffle plates 62 closest to inner wall 36.

As the incoming air is drawn through the inlet chamber 18 and reaches the bottom thereof, it is abruptly drawn to the right as seen in FIG. 2 to be drawn through the baffle plate 62. The abrupt change in direction as the air reaches the bottom of the inlet chamber, causes the heavier particles and/or impurities in the air to remain at the bottom of the main and inlet chambers of the processing portion 12. Further impurities are lost as the air is further cooled by contact with the main body of water 19.

As the air is drawn through the water and the baffle plate 62, the air is shredded and as it contacts the water, the water removes the impurities in the air. This process is repeated as the air is continued to be drawn through the baffle plate and past the expanded metal screens 64, 66 and 68. The air continues to be shredded finer and finer as it passes through each successive perforated member so that the contact between the water and the air continues to draw out the impurities from the air in each successive stage. As best seen in FIG. 2, as the air is drawn through the water 19 and then through the various baffle plates 62, screens 64, 66 and 68, a layer of water is produced above each. Thus, a layer of water is produced over baffle plates 62 and each of the screens 64, 66 and 68. These layers of water above the plates and screens are turbulently intermingled with the air and cause the air to be scrubbed as it passes therethrough.

It should be noted that the screens 64, 66 and 68 and baffles 62 do not act to filter the air as it passes through, but rather act to cause the shredding of the air to break it down into its finest molecules in order to be scrubbed by the water as contact is made therebetween. Therefore, the water 19 may be used and reused for a relatively long period of time without replacement thereof. Continuous drainage through the system of fresh water is thereby obviated. After a relatively long period of operation, the water 19 may be drained out by opening valve 124 and allowing the water to drain out of pipe 132. During the operation of the anti-air pollution device 10, solenoid 128 is energized thereby allowing water to pass through intermediate pipe 126 and out drain pipe 132. Therefore, if the water pressure becomes too great as a result of too much water being provided to the system, the intermediate pipe passes the water to the drain pipe 132 to remove the excess water.

It can therefore be seen that an inexpensive anti-air pollution device has been provided. There are no mechanical moving parts other than the fan throughout the air scrubbing portion of the system. The cost of maintaining the anti-air pollution device in operation is thus relatively inexpensive. Moreover, the water 19 need only be replaced after long intervals of use and only a fine spray of water is released from the spray pipe 116 during operaton of device 10 in order to replenish the water which has evaporated during the use of the device.

Without further elaboration, the foregoing will so fully illustrate my invention, that others may by applying current of future knowledge, readily adapt the same for use under various conditions of service.

What is claimed as the invention is:

1. An anti-air pollution device for removing impurities from polluted air, said device comprising a housing having an inlet chamber, a main chamber, and an exhaust means for drawing said polluted air through said inlet and said main chambers, said inlet chamber and said main chamber having a common portion which acts as a receptacle for water, said main chamber further including a first perforated member comprising a baffle plate having a plurality of spaced openings throughout said plate, said openings comprising less than one-half (½) the area of said baffle plate and being more spaced from each other as the distance from said inlet decreases for distributing said air drawn from said inlet chamber uniformly through said main chamber, the level of said water being at a substantially equal level with said baffle plate when said exhaust means is not operating, said first member extending substantially transversely to the path of flow of said air in said main chamber, said water and said first member acting to shred said polluted air as it is drawn through said water in said common portion and said first member so that contact between said water and said shredded air removes said impurities from said polluted air.

2. The invention of claim 1 wherein said main chamber is rectangularly shaped and includes a pair of elongated straight supporting members on opposite sides of said chamber adapted to hold a plurality of perforated inserts, said inserts including, in addition to said first perforated member, a plurality of perforated members which are vertically spaced above said first member and from each other to provide successive perforated members which are parallel to said first member and vertically spaced therefrom, said first and said plurality of perforated members being formed as a plurality of said perforated inserts each including a portion of said perforated members.

3. The invention of claim 1 wherein a plurality of perforated members are provided above said first perforated member for further shredding of said air and for providing additional contact between said water and said shredded air for additional removal of said impurities.

4. The invention of claim 1 wherein said exhaust means includes a fan, said fan being adapted to draw said polluted air through said anti-air pollution device for scrubbing said air and further adapted to emit said scrubbed air into the atmosphere.

5. The invention of claim 1 wherein said anti-air pollution device further includes a drain pipe for draining off said water in said common portion when said water reaches a predetermined level.

6. The invention of claim 1 wherein said anti-air pollution device further includes a draining system for draining off water for draining out the water in said common portion when said device is not in opeartion and an intermediate portion for draining off excess water which gets into the system during operation of said device.

7. The invention of claim 1 wherein said inlet chamber includes a spray member for emitting a fine spray of water into said chamber as said polluted air is drawn into said anti-air pollution device so that loss by evaporation of said water in said common receptacle is replenished during the continued operation of said anti-air pollution device.

8. The invention of claim 1 wherein said inlet chamber and said main chamber are separated by a wall along a major portion of their common boundary, said incoming polluted air being drawn about said wall in order to be scrubbed, said air being drawn at a sharp angle around said wall so that heavier particles from said polluted air remain in said water due to inertia.

References Cited

UNITED STATES PATENTS

| | | | |
|---|---|---|---|
| 1,049,988 | 1/1913 | Briede | 55—249 |
| 1,708,656 | 4/1929 | Bradshaw | 55—418 |
| 2,006,927 | 7/1935 | Lowther | 55—249 |
| 2,022,740 | 12/1935 | Rowell | 261—105 |
| 2,083,649 | 6/1937 | Heglar | 183—48 |
| 2,468,934 | 5/1949 | Kleyn | 261—123 X |
| 2,608,399 | 8/1952 | Alcock | 261—123 X |
| 2,385,077 | 9/1945 | Harker et al. | 55—241 X |

FOREIGN PATENTS 907,264  10/1944  France.

FRANK W. LUTTER, Primary Examiner

S. M. MARKOWITZ, Assistant Examiner

U.S. Cl. X.R.

55—249, 489; 261—100, 122